United States Patent Office 3,431,067
Patented Mar. 4, 1969

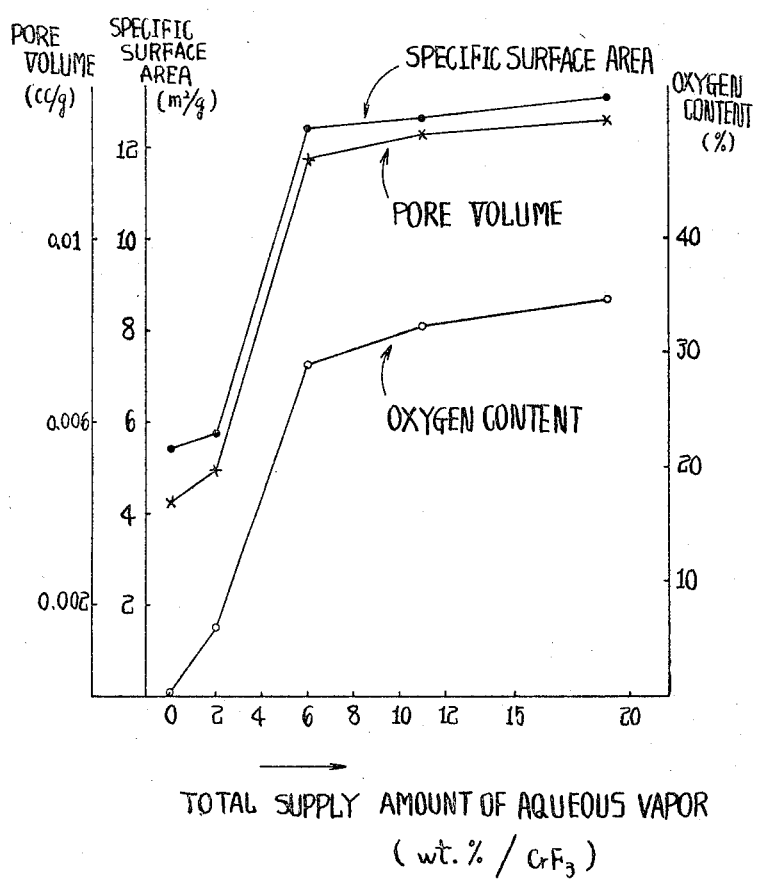

3,431,067
METHOD OF MANUFACTURING A
FLUORINATION CATALYST
Kaoru Kato, Toyonaka-shi, and Shigeyoshi Ogawa, Suita-shi, Japan, assignors to Daikin Kogyo Kabushiki Kaisha, Osaka-shi, Japan
Filed Jan. 18, 1966, Ser. No. 521,394
Claims priority, application Japan, Jan. 23, 1965, 40/3,536
U.S. Cl. 23—88    13 Claims
Int. Cl. C01b 9/08; B01j 11/78

ABSTRACT OF THE DISCLOSURE

Anhydrous chromium fluoride is heated at 300° to 750° C. in a stream of a gaseous mixture of molecular oxygen and water vapor to provide an improved activated amorphous fluorination catalyst.

At least 6 weight percent of water vapor is used based on the weight of chromium fluoride being activated.

---

This invention relates to an improved fluorination catalyst, a process for preparing such catalyst, and a process for fluorinating halohydrocarbons, using the catalyst.

Heretofore, it has been known that some halohydrocarbons can be fluorinated by vapor-phase reaction with hydrogen fluoride in the presence of a metallic halide fluorination catalyst. In U.K. Patent No. 799,335 it is disclosed that chromium oxyfluoride is effective in catalyzing such vapor-phase fluorination reactions. Said chromium oxyfluoride has been prepared by heating hydrated chromium fluoride in the presence of molecular oxygen at an elevated temperature, 350° to 750° C. It is also disclosed that it is essential to employ hydrated chromium fluoride as the material to be activated, because an effective fluorination catalyst can not be prepared from anhydrous chromium fluoride, $CrF_3$. However, as described in U.K. Patent No. 821,211, when certain halohydrocarbons are fluorinated with hydrogen fluoride over the chromium oxyfluoride catalyst obtained by the above described process, the catalytic activity thereof is markedly reduced in a relatively short time due to the formation of carbon deposits on the catalyst, resulting in decreased catalyst life. Although the thus contaminated catalyst may be regenerated by contacting it with oxygen at about 500° C. this requires an interruption of the fluorination process and usually requires up to about 2 hours to regenerate the catalyst satisfactorily, making its commercial use difficult. Moreover, the employment of said catalyst in fluorination processes requires a relatively high temperature if it is desired to obtain the fluorinated products in a high yield.

The present inventors have investigated the possibility of obtaining a fluorination catalyst having a more extended life and higher catalytic activity from anhydrous chromium fluoride which has been considered incapable of providing an activated fluorination catalyst in the aforementioned prior art.

A principal object of this invention, accordingly, is to provide an extended-life catalyst of higher catalytic activity, making it possible to produce the desired fluorinated hydrocarbons selectively in a high yield even after the catalyst is employed continuously for a long time. Another object of this invention is to provide a process for manufacturing a catalyst having said characteristics from anhydrous chromium fluoride. A further object of this invention is to provide a process for fluorinating halohydrocarbons using this catalyst. Other objects and specific features of this invention will be apparent from the following description.

The present invention is based on the discovery that anhydrous chromium fluoride may be activated when it is heated to a temperature of from 300° to 750° C. in a continuous stream of a gaseous mixture containing molecular oxygen and water vapor, and that the catalyst thus activated exhibits a markedly higher catalyzing effect in the vapor-phase fluorination reaction of halohydrocarbons with hydrogen fluoride and the life of the catalyst is markedly extended.

In the present invention the material to be activated is anhydrous chromium fluoride, which may be prepared by any of the conventional methods. For instance, it may be prepared by fluorinating chromium trioxide ($CrO_3$) with an excess amount of hydrofluoric acid in the presence of a reducing agent and heating the resultant hydrated chromium fluoride at a temperature of higher than 600° C.

The anhydrous chromium fluoride may be mixed with graphite and/or silicon dioxide, shaped into desired forms such as tablets, pellets, etc., and then subjected to the activation process of the present invention. The graphite, silicon dioxide, or mixture thereof, is employed in the range of from 1 to 10 weight percent, preferably from 2 to 4 weight percent, based on the weight of anhydrous chromium fluoride employed. The silicon dioxide employed alone, or in admixture with graphite, facilitates the prevention of corrosion of the activating reactor and helps to increase the porosity of the catalyst. Silicon dioxide may be further added to the $CrF_3$ tablets or pellets so as to be interspersed among them in the range of less than 40 weight percent, preferably from 5 to 20 weight percent, based on the weight of the $CrF_3$ tablets or pellets.

The activation process is carried out in a stream of a gaseous mixture of molecular oxygen and water vapor. Oxygen gas or air may be employed as the oxygen source. The ratio of molecular oxygen to the anhydrous chromium fluoride to be activated varies over a wide range, but it is preferred to employ molecular oxygen in the range of at least 30 cc./hr., particularly from 50 to 150 cc./hr., per gram of anhydrous chromium fluoride being activated.

It is essential in the present invention that the gas stream contain water vapor in addition to the molecular oxygen and that the water vapor be fed in a continuous manner into the activation reaction system, since the desired catalyst, i.e., one having an extended life and a high degree of catalytic activity, can not be obtained if water vapor is not fed at all or is fed intermittently. The ratio of water vapor to anhydrous chromium fluoride is critical in the invention and it is necessary to supply water vapor in the range of at least 6 weight percent, preferably from 10 to 40 weight percent, in terms of the total amount of water vapor so supplied, based on the weight of anhydrous chromium fluoride to be activated. A larger amount of water vapor may be employed in the invention without any adverse effect. Even if 300 weight percent of water vapor is employed, for example, the catalytic activity and the catalyst life are not adversely affected. The gaseous mixture of molecular oxygen and water vapor may be prepared by various methods, for example, by mixing water vapor with a molecular oxygen-containing gas such as oxygen or air, or by introducing a molecular oxygen-containing gas into water.

An activation temperature of from 300° to 750° C. is used in the process of the present invention. It is preferred to heat anhydrous chromium fluoride rapidly to above 300° C. in order to obtain a catalyst of high activity. The gaseous mixture which contains molecular oxygen and water vapor is continuously fed from the initial stage of the activation reaction.

The activation reaction is carried out for a time sufficiently long to convert the chromium fluoride to the activated catalyst. In general, the activation reaction is completed in a period of from 60 to 240 minutes, although a more prolonged period of time may be applicable without adversely affecting the catalytic activity and the catalyst life.

Alternatively, anhydrous chromium fluoride may be subjected to the above-mentioned activation process of this invention after impregnating it into porous materials, such as, active carbon, active alumina, etc. without preparing shaped tablets or pellets therewith.

The fluorination catalyst of this invention has been confirmed by elemental analysis to be a material comprising three components, i.e., chromium, fluorine and oxygen, and confirmed by X-ray diffraction analysis to be amorphous and to be devoid of solid crystalline $Cr_2O_3$, $CrO_3$ and $CrF_3$.

The fluorination catalyst of this invention is further characterized by having a larger degree of specific surface area, pore volume and oxygen content than that of catalyst activated in the presence of less than 6 weight percent of water vapor. It has now been found that the specific surface area, pore volume and oxygen content of the catalyst are closely related to the amount of water vapor supplied to the activation reaction. Thus, with a total amount of less than 6 weight percent of water vapor being supplied, based on the starting anhydrous chromium fluoride, these increase proportionally with an increase in the amount of water vapor being supplied, and with a total amount of 6 weight percent or more supplied these values are unusually high and at a fairly constant level.

These facts are better illustrated in the attached drawing.

The drawing is a graphic diagram which illustrates the relation between the total amount of water vapor employed in the activation process and the properties of the catalyst, i.e., specific surface area, pore volume and oxygen content that are obtained. The catalysts tested were prepared by the method of Example 1 herein in which the total amount of water vapor supplied was varied from 0 to 19 weight percent based on the weight of anhydrous chromium fluoride employed. The specific surface area was determined by the B.E.T. method which comprises measuring the amount of nitrogen gas absorbed by the catalyst at a liquid nitrogen temperature. The pore volume was determined by the method described in J. Am. Chem. Soc. 78, 373 (1951), and the oxygen content in the catalyst was determined by elemental analysis.

The compounds which may be fluorinated using the catalyst of this invention are partially or completely halogenated aliphatic hydrocarbons having from 1 to 4 carbon atoms, which are devoid of iodine and contain at least one halogen other than fluorine. Representative of such compounds are carbon tetrachloride, chloroform, methylene chloride, methylene bromide, methylene chlorobromide, dichlorodifluoromethane, chlorodifluoromethane, trichlorofluoromethane, dibromodifluoromethane, hexachloroethane, tetrachloroethylene, 1,1,2 - trichloro - 1,2,2-trifluoroethane, 1,1,2,2 - tetrachloro - 1,2 - difluoroethane, 1,2 - dichloro - 1,1,2,2 - tetrafluoroethane, 2,2 - dichloropropane, 1,1,1 - trichloropropane, 1,1,1,2,3 - pentachloropropene, perchlorobutadiene, 2,3 - dichlorohexafluoropropylene, etc. The catalyst of this invention is particularly useful for fluorinating 1,1,2 - trichloro - 1,2,2 - trifluoroethane with hydrogen fluoride to provide 1,2-dichloro-1,1,2,2-tetrafluoroethane which is useful as an aerosol propellant, refrigerant, etc.

The fluorination reaction is carried out by passing the halohydrocarbon to be fluorinated, in a vaporized state, together with hydrogen fluoride through a bed of the catalyst of the present invention at an elevated temperature. The reaction temperature varies over a wide range depending on the reactivity of the halohydrocarbons being fluorinated, the activity of the catalyst, contact time, the products desired, and other factors, but a temperature of from 100° to 600° C., and preferably from 200° to 450° C., is usually applied in the fluorination reaction. One advantage of the fluorination process of the present invention is that the fluorinated products desired are prepared in a high yield at lower temperatures than are required in fluorination reactions using the prior art catalysts.

The ratio of hydrogen fluoride to halohydrocarbon employed also varies over a wide range depending on the product desired, but usually it is advantageous to employ hydrogen fluoride in a stoichiometric or slightly excess amount. For instance, in fluorinating 1,1,2-trichloro-1,2,2-trifluoroethane to 1,2-dichloro-1,1,2,2-tetrafluoroethane, hydrogen fluoride is preferably employed in the amount of at least one mole per mole of 1,1,2-trichloro-1,2,2-trifluoroethane.

Contact time is not critical in the fluorination process of this invention and it may vary over a wide range, but ordinarily it is sufficient to employ a short contact time, as 1 to 30 seconds. For instance, in fluorinating 1,1,2-trichloro - 1,2,2 - trifluoroethane to 1,2 - dichloro - 1,1,2,2-tetrafluoroethane, a contact time of less than 5 seconds is usually used with good results. The fluorination reaction of this invention may be carried out at both atmospheric pressure and super-atmospheric pressure.

The gaseous products of the fluorination process may be separated into their components by conventional methods, such as a combination of condensation, distillation, washing, drying and like procedures.

The following examples are given to illustrate the processes of the present invention, but are not to be construed as limiting the scope thereof. In these examples, the specific surface area, pore volume and oxygen content of the catalysts were determined by the same methods as described above, and the average radius of the pores was calculated from the pore volume and surface area of the catalyst, all the pores of the catalyst being assumed to be cylindrical.

EXAMPLE 1

A 4-liter nickel container was charged with 625 grams of a commercial grade high purity chromium trioxide ($CrO_3$), about 1,500 grams of 50 weight percent hydrofluoric acid and 137 grams of glucose. The mixture was heated to 700° C. and maintained for 5 hours at such temperature, whereby 640 grams of anhydrous chromium fluoride was obtained. The identification of the compound was confirmed by differential thermal analysis.

The resultant anhydrous chromium fluoride was pulverized into 40 to 90 mesh powders and mixed with 2 weight percent of white carbon, i.e., silicon dioxide, and 1 weight percent of graphite, based on the weight of anhydrous chromium fluoride employed, to form tablets 6 millimeters in thickness and 6 millimeters in diameter. A mixture of 350 grams of the resultant tablets and 7 weight percent of white carbon, based on the weight of anhydrous chromium fluoride, was loaded into a 1000 millimeter long transverse Monel reactor tube having an inside diameter of 38 millimeters so as to provide a bed of the anhydrous chromium fluoride tablets 255 millimeters in length, among which white carbon was interspersed.

A stream of air containing water vapor was passed over the bed of $CrF_3$ tablets at the rate of 2,200 milliliters per minute. The reaction system was then rapidly heated to 400° C. in about 20 minutes and the temperature was then gradually raised to 700° C. over a period of an additional 60 minutes, maintained for 20 minutes longer at such temperature, and then lowered to room temperature. Said stream of air containing aqueous vapor was passed in a continuous and constant manner during the course of the activation reaction and the total amount of aqueous vapor thus passed was 11 weight percent on the basis of the weight of anhydrous chromium fluoride.

Elemental analysis of the resultant activated catalyst gave the values of F=11.4%, Cr=56.2% and O=32.4%, and the physical properties of the catalyst were as follows:

Specific surface area, m.$^2$/g. _____ 12.68
Pore volume, cc./g. _____ 0.0123
Average radius of pores, A. _____ 19.4

In order to specify the preventing effect for the corrosion owing to the employment of silicon dioxide, the following two tests were performed.

*Test A.*—The activation reaction was carried out repeatedly 30 times in the same manner as described in Example 1, except that a Monel test piece of 40 millimeters in length, 10 millimeters in width and 3 millimeters in thickness was inserted into the catalyst bed.

*Test B.*—The activation reaction was carried out repeatedly 30 times in the same manner as described in Example 1, except that the CrF$_3$ tablets were prepared by employing 2 weight percent of graphite on the basis of the weight of the CrF$_3$ in place of the white carbon and graphite employed in Example 1 and the catalyst was activated without interpersing white carbon among the tablets and in the presence of a 40 mm. x 10 mm. x 3 mm. Monel test piece inserted into the catalyst bed.

Each test piece employed in Test A and Test B was weighed before, during and after the tests, and the corrosion rate, as defined by the following equation, is shown in Table 1 below.

Corrosion rate (mg./cm.$^2$×10$^2$/day) =

$$\frac{\text{Decreased weight of the test piece}}{\text{Total surface area of the test piece}} \times \frac{24}{\text{Activation period}}$$

TABLE 1

| Round of activation | Activation period (min.) | Corrosion rate (mg./cm.$^2$×10$^2$/day) | |
|---|---|---|---|
| | | A | B |
| 10 | 1,000 | 0.93 | 3.069 |
| 20 | 2,000 | 1.12 | 9.542 |
| 30 | 3,000 | 1.29 | 15.124 |

From the above results it is obvious that the presence of silicon dioxide in the activation process is effective for preventing corrosion of the activating Monel reactor.

EXAMPLE 2

Anhydrous chromium fluoride tablets were prepared in a manner similar to that described in Example 1 without employing graphite, and activated in the same manner as described in Example 1 except that the total amount of water vapor passed was 17 weight percent, based on the weight of anhydrous chromium fluoride.

Elemental analysis of the resultant activated catalyst gave the values of F=10.9%, Cr=54.8% and O=34.3%. Physical properties of the catalyst were as follows:

Specific surfaces area, m.$^2$/g. _____ 13.1
Pore volume, cc./g. _____ 0.0127
Average radius of pores, A. _____ 19.4

EXAMPLE 3

1,300 grams of chromic chloride were admixed with 6,000 grams of a 20 weight percent solution of ammonia in water, thereby precipitating 820 grams of chromic hydroxide. The chromic hydroxide was reacted with 1,400 grams of hydrofluoric acid, and the product (CrF$_3$·3H$_2$O) was heated at 700° C. for 5 hours after removing the unreacted HF, whereby 810 grams of anhydrous chromium fluoride was obtained. The identification of the compound was confirmed by differential thermal analysis.

The resultant anhydrous chromium fluoride was pulverized into 40 to 90 mesh powders and mixed with 2 weight percent of white carbon and 2 weight percent of graphite, based on the weight of anhydrous chromium fluoride employed, to form tablets 6 mm. in thickness and 6 mm. in diameter. The tablets were activated in the same manner as described in Example 1, except that the total amount of water vapor passed was 35–40 weight percent, based on the weight of CrF$_3$, and the activating period was 120 minutes.

Elemental analysis for the resultant activated catalyst gave the values of F=11.2%, Cr=56.2% and O=32.6%. Physical properties of the catalyst were as follows:

Specific surface area, m.$^2$/g. _____ 12.38
Pore volume, cc./g. _____ 0.0118
Average radius of pores, A. _____ 19.0

EXAMPLE 4

The activated catalyst of the present invention was prepared in the same manner as described in Example 1 except that water vapor was employed at a rate of 95 weight percent on the basis of the weight of anhydrous chromium fluoride.

Elemental analysis for the resultant activated catalyst gave the values of F=11.2%, Cr=53.6% and O=35.2%. Physical properties of the catalyst were as follows:

Specific surface area, m.$^2$/g. _____ 12.7
Pore volume, cc./g. _____ 0.0121
Average radius of pores, A. _____ 19

EXAMPLE 5

For a better understanding of the invention, this example illustrates the fluorination of 1,1,2-trichloro-1,2,2-trifluoroethane to 1,2-dichloro-1,1,2,2-tetrafluoroethane using the catalysts obtained in Examples 1 to 4 above and the catalytic activity and catalyst life thereof in comparison with catalyst prepared by the following method A which is not in accord with the invention.

(A) Preparation of the comparative catalyst

The comparative catalyst was prepared in the manner described in Example 1 except that the total amount of water vapor employed was reduced to 2 weight percent based on the weight of anhydrous chromium fluoride.

Elemental analysis of the catalyst gave the values of F=48.3%, Cr=45.7% and O=6.0%. Physical properties of the catalyst were as follows:

Specific surface area, m.$^2$/g. _____ 5.7
Pore volume, cc./g. _____ 0.0049
Average radius of pores, A. _____ 17.2

From the above results, it is obvious that the comparative catalyst thus obtained has a lower degree of specific surface area, pore volume and oxygen content than that of the catalysts prepared in Examples 1 to 4 above.

(B) Fluorination of 1,1,2-trichloro-1,2,2-trifluoroethane and catalytic activity test The vapor phase fluorination of 1,1,2-trichloro-1,2,2-trifluoroethane was carried out by using, respectively, catalysts obtained by Examples 1 to 4 and the comparative catalyst obtained in the above described method A in the following manner:

150 grams of each catalyst was loaded into a stainless steel vertical reaction tube 2000 millimeters in length and 400 millimeters in inside diameter so as to provide bed of the catalyst. The upper part of the tube, 1,000 millimeters in length from the top of the tube, was maintained at 200° C.±10° C. and the lower part, 1,000 millimeters in length, was maintained at the temperature specified in Table 2 below by means of an electric furnace surrounding the reaction tube.

Prior to the fluorination reaction, hydrogen fluoride was passed over the bed of catalyst for 10 minutes, and then hydrogen fluoride and 1,1,2-trichloro-1,2,2-trifluoroethane was passed over the bed of catalyst under the conditions specified in Table 2 below.

The effluent gas stream from the reactor was washed with water and with an aqueous solution of alkali, dried with calcium chloride, and condensed in a cold trap. The gas stream, dried with CaCl$_2$, was taken out with a syringe for analysis, prior to the condensation.

Gas chromatographic analysis thereof gave the results specified in Table 2 below.

TABLE 2

| Catalyst | Reaction temperature (° C.) | HF/CFCl$_2$CF$_2$Cl (mole ratio) | Contact time (sec.) | Component of the gas stream in mole percent | | |
|---|---|---|---|---|---|---|
| | | | | CF$_2$ClCF$_3$ | CF$_2$ClCF$_2$Cl | CFCl$_2$CF$_2$Cl |
| Example 1 | 330±10 | 1.32 | 2.31 | 4.8 | 83.9 | 11.3 |
| Example 2 | 330±10 | 1.34 | 2.4 | 6.6 | 82.1 | 11.3 |
| Example 3 | 330±10 | 1.39 | 2.42 | 4.1 | 84.5 | 11.4 |
| Example 4 | 330±10 | 1.40 | 2.38 | 5.8 | 84.1 | 10.1 |
| Comparative | 330±10 | 1.39 | 2.30 | 1.8 | 65.2 | 33.0 |
| | 550±10 | 1.40 | 5.1 | 3.9 | 81.9 | 14.2 |

These results show that with the catalysts of the present invention a high conversion of the starting CFCl$_2$CF$_2$Cl to the desired CF$_2$ClCF$_2$Cl is secured at 330±10° C., whereas with the comparative catalyst such temperature is inadequate to provide the same high conversion and a higher temperature, 550° C., is required for good results.

(C) Catalyst-life test

The fluorination reaction described in method B above was carried out by using, respectively, the catalyst of Example 1 and the comparative catalyst at 550°±10° C. for the long periods of time specified in Table 3 below, and a catalyst-life coefficient based on such tests was determined by the following equation.

Catalyst-life coefficient =

$$\frac{\text{Mole percent of CF}_2\text{ClCF}_2\text{Cl in the gas stream analyzed at the end of the specified time after initiation of the reaction}}{\text{Mole percent of CF}_2\text{ClCF}_2\text{Cl in the gas stream analyzed at 3 hours after initiation of the reaction}} \times 100$$

TABLE 3

| Catalyst | Lapse of time after the initiation of the reaction (hr.) | Catalyst-life coefficient | Specific surface area (m.$^2$/g.) | Pore volume (cc./g.) | Average radius of pores (A) |
|---|---|---|---|---|---|
| Example 1 | 0 | | 12.68 | 0.0123 | 19.4 |
| | 3 | 100 | | | |
| | 30 | 98.4 | | | |
| | 60 | 97.1 | | | |
| | 500 | 92.3 | 9.3 | 0.0088 | 18.9 |
| Comparative | 0 | | 5.7 | 0.0049 | 17.2 |
| | 3 | 100 | | | |
| | 30 | 94.2 | | | |
| | 50 | 92.6 | | | |
| | 60 | 90.1 | 2.7 | 0.0025 | 18.5 |

From the above results, it is obvious that the catalyst of the present invention has such a markedly extended life that it exhibits a high degree of catalytic activity even after being used 500 hours, whereas the comparative one loses its activity in a very short time.

What is claimed is:

1. A method of manufacturing an activated amorphous fluorination catalyst which comprises heating anhydrous chromium fluoride to a temperature of from 300° to 750° C. in a continuous stream of a gas mixture containing molecular oxygen and water vapor, the total amount of said water vapor employed being in the range of at least 6 weight percent based on the weight of anhydrous chromium fluoride employed, said molecular oxygen being employed in the amount of at least 30 cc./hour per gram of anhydrous chromium fluoride employed, and said heating in said gas mixture being conducted for a period of time sufficient to provide an activated chromium fluoride catalyst which is amorphous and has a composition which consists of chromium, fluorine and oxygen.

2. The method of claim 1 in which the total amount of water vapor employed is in the range of from 10 to 40 weight percent based on the weight of anhydrous chromium fluoride employed.

3. The method of claim 1 in which said molecular oxygen is employed in the amount of from 30 cc. to 150 cc./hour per gram of anhydrous chromium fluoride employed.

4. The method of claim 1 in which said anhydrous chromium fluoride is employed in the form of small shaped articles prepared from a mixture of anhydrous chromium fluoride and at least one member of the group consisting of graphite and silicon dioxide.

5. The method of claim 4 in which silicon dioxide is interspersed among the small shaped articles.

6. The method of claim 1 in which said period of time is at least 60 to 240 minutes.

7. The method of claim 4 in which said articles are prepared from a mixture containing less than 40 weight percent of said members.

8. The method of claim 4 in which said articles are prepared from anhydrous chromium fluoride and silicon dioxide.

9. The method of claim 4 in which said articles are prepared from anhydrous chromium fluoride and graphite.

10. The method of claim 7 in which said articles are prepared from a mixture containing from 5 to 20 weight percent of said members.

11. The method of claim 1 in which the activated amorphous catalyst which is provided has a specific surface area of greater than 12 m.$^2$/gram.

12. A method of manufacturing an activated amorphous fluorination catalyst which comprises heating anhydrous chromium fluoride to a temperature of from 300° to 750° C. for 60 to 240 minutes in a continuous stream of a gas mixture containing molecular oxygen and water vapor, the total amount of said water vapor employed being in the range of 6 to 40 weight percent based on the weight of anhydrous chromium fluoride employed, and said molecular oxygen being employed in the amount of 30 to 150 cc./hour per gram of anhydrous chromium fluoride employed, so as to provide an activated chromium fluoride catalyst which is amorphous, has a composition which consists of chromium, fluorine and oxygen, has a specific surface area of about 12 to 13 square meters/gram, has a pore volume of about 0.012 to 0.013 cc./gram, and has an oxygen content of about 30 to 35%.

13. An activated chromium fluoride catalyst produced by the process of claim 1 which is amorphous, has a composition which consists of chromium, fluorine and oxygen, has a specific surface area of about 12 to 13 square meters/gram, has a pore volume of about 0.012 to 0.013 cc./gram, and has an oxygen content of about 30 to 35%.

References Cited

UNITED STATES PATENTS

| | | | |
|---|---|---|---|
| 2,745,867 | 5/1956 | Ruh et al. | 252—441 XR |
| 2,745,886 | 5/1956 | Ruh et al. | 252—441 XR |
| 2,863,824 | 12/1958 | Grosse et al. | 252—441 XR |
| 2,952,715 | 9/1960 | Donaldson | 252—441 XR |
| 2,960,554 | 11/1960 | Sandri et al. | 252—441 XR |
| 3,183,276 | 5/1965 | Vecchio | 252—441 XR |
| 3,341,281 | 12/1967 | Davis et al. | 23—88 |

EDWARD STERN, *Primary Examiner.*

U.S. Cl. X.R.

252—416, 441, 442; 260—653, 653.4